United States Patent Office 3,400,132
Patented Sept. 3, 1968

3,400,132
TERTIARY 2,6-DIHALO-ISONICOTINAMIDE DERIVATIVES
Bruce Wayne Horrom, Waukegan, Ill., assignor to Abbott Laboratories, North Chicago, Ill., a corporation of Illinois
No Drawing. Filed May 31, 1966, Ser. No. 553,693
9 Claims. (Cl. 260—294.9)

ABSTRACT OF THE DISCLOSURE

Tertiary 2,6-dihaloisonicotinamides carrying specific short-chain alkyl, chloroalkyl, cyanoalkyl or hydroxyalkyl substituents on the amido nitrogen are highly effective as tranquilizers in warm-blooded animals at very low oral or intraperitoneal dosages. In larger dosages, the new compounds act as sedatives.

---

The present invention is directed to isonicotinic acid amides; more particularly it is directed to 2,6-dihaloisonicotinamides substituted at the amido nitrogen.

The present invention is particularly concerned with the preparation of compounds of the formula

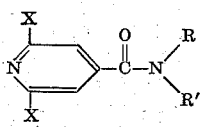

wherein each X is chlorine or bromine, R is a saturated or unsaturated, linear alkyl, cycloalkyl, chloroalkyl or cyanoalkyl and R' is alkyl, chloroethyl, cyanoethyl, hydroxyethyl or cyclopropyl. In all instances, the terms "alkyl" or "cycloalkyl" are limited to no more than 4 carbon atoms. In warm-blooded aminals, these new compounds are highly effective as tranquilizers at very low dosages; at somewhat higher dosages they possess valuable sedative activity; for example, oral dosages of 2.5 mg./kg. in mice, dogs or monkeys and 2.5 mg./kg. intraperitoneally in cats produce marked tranquilizing effects. When these dosages are increased two- to tenfold, marked sedative activity can be observed in warm-blooded animals.

In a general embodiment, the new compounds of the present invention are prepared by reacting 2,6-dihaloisonicotinic acid chloride with an amine of the formula RNR' at a temperature below 25° C. and in the presence of at least one molar equivalent of an organic or inorganic base, e.g. sodium bicarbonate or a tertiary amine, using a low-boiling, or water-soluble organic solvent, e.g. chloroform, ether, tetrahydrofuran, benzene, dimethylformamide, or dimethylacetamide as the reaction medium. The formed amides can easily be isolated from the reaction mixture: when the amide is soluble in the reaction medium employed, the reaction mixture is filtered and the reaction solvent is removed from the filtrate; where the new amide is insoluble in the reaction medium employed, it precipitates from the reaction mixture together with the hydrochloride of the tertiary amine. The mixture is then filtered and the tertiary amine hydrochloride is removed by trituration with water, leaving the crude new amide. It is important that the temperature is kept below 25° C. during the reaction to prevent the formation of color and undesirable by-products. Ordinarily, equimolar amounts of the acid chloride and the amine are used, although 5 to 30% excess of either reactant will not substantially change the overall yield obtained.

In a modification of the procedure outlined, the acid-binder may be replaced by an equimolar and additional amount of the amine with which the isonicotinoyl chloride is reacted. When this is too costly, a simple tertiary amine such as triethylamine, triethanolamine, pyridine, quinoline or an inorganic acid-binder, e.g. potassium hydroxide or sodium carbonate is used to bind the hydrochloric acid formed in the reaction.

In order to illustrate specific embodiments of the above process and compounds, reference is made to the following examples which are not to be construed as limitations of the process.

Example 1.—N-cyclopropyl-N-ethyl-2,6-dihaloisonicotinamides (a) A solution of 10.9 g. of 2,6-dichloro-isonicotinoyl chloride in 150 ml. of anhydrous ether was added to a solution of 4.43 g. of N-ethylcyclopropylamine and 5.268 g. of triethylamine in 50 ml. of anhydrous ether over a period of one hour and under cooling. Stirring was subsequently continued for another 15 minutes. The reaction mixture was then washed with ice-cold water. The ether layer was separated, dried over anhydrous magnesium sulfate and the ether was removed in vacuo to produce 13 g. (97% of theory) of N-cyclopropyl-N-ethyl-2,6-dichloroisonicotinamide melting at 85–85.5° C. The crude material was recrystallized from n-pentane and was obtained as a colorless material melting at 85–86° C.

(b) When in the above example the 2,6-dichloro-isonicotinoyl chloride was replaced by 2,6-dibromo-isonicotinoyl chloride, the procedure described above produced N-ethyl-N-cyclopropyl - 2,6-dibromo-isonicotinamide which, when recrystallized from ethanol, melts at 105.5–107° C.

Examples 2–18

By following the procedure described in Example 1 above, but using different amines to react with 2,6-dichloro-isonicotinic acid, the following new amides are prepared.

In the table below, X is the abbreviation for 2,6-dichloroisonicotinamide. A variation in the procedure of Examples 7 and 8 consisted in using chloroform as the reaction medium; in Example 10, benzene was the reaction medium. For the compounds of Examples 2, 11, 12 and 13, both reactants were dissolved in tetrahydrofuran and the amide was precipitated from the reaction mixture by adding about 5 volumes of water. A similar modification was used in Examples 4 and 5, using dimethylacetamide and dimethylformamide respectively, as the reaction mediums. In Examples 16 and 17, an aqueous solution of the amine-hydrochloride was reacted with a chloroform solution of the acid chloride.

| Example No. | Amine used | Amide obtained | Physical data |
|---|---|---|---|
| 2 | $NH(CH_3)_2$ | N,N-dimethyl-X | M.P. 104–105°. |
| 3 | $n\text{-}C_3H_7NHCH_3$ | N-methyl-N-propyl-X | B.P. 185–8°/0.1 mm. |
| 4 | $NH(C_2H_5)_2$ | N,N-diethyl-X | M.P. 78–80°. |
| 5 | $NH(n\text{-}C_3H_7)_2$ | N,N-dipropyl-X | B.P. 160°/1.2 mm. |
| 6 | $CH_3NHCH_2C \equiv N$ | N-methyl-N-cyanomethyl-X | M.P. 99–101°. |
| 7 | $C_2H_5NHCH_2C \equiv N$ | N-ethyl-N-cyanomethyl-X | M.P. 89–91°. |
| 8 | $NH(CH_2CH_2C \equiv N)_2$ | N,N-di-(β-cyanoethyl)-X | M.P. 164–165°. |
| 9 | ▷—NHCH₃ | N-methyl-N-cyclopropyl-X | M.P. 94–96°. |
| 10 | ▷—NH-(CH₂)₃H | N-propyl-N-cyclopropyl-X | M.P. 50–52°. |
| 11 | ▷—NHCH₂CH=CH₂ | N-allyl-N-cyclopropyl-X | M.P. 50°. |
| 12 | ▷—NHCH₂C≡CH | N-propargyl-N-cyclopropyl-X | M.P. 94–95.5°. |
| 13 | ▷—NHCH₂—◁ | N-cyclopropylmethyl-N-cyclopropyl-X | M.P. 79–80°. |
| 14 | ▷—NH—◇ | N-cyclopropyl-N-cyclobutyl-X | B.P. 150/0.2 mm. |
| 15 | ▷—NH-CH₂CN | N-cylopropyl-N-cyanomethyl-X | M.P. 67–68°. |
| 16 | ▷—NH-CH₂CH₂OH | N-cylopropyl-N-β-hydroxymethyl-X | M.P. 99–100°. |
| 17 | $NH(CH_2CH_2Cl)_2$ | N,N-di-β-chloroethyl-X | M.P. 97–98°. |
| 18 | $CH_3NHCH_2C \equiv CH$ | N-propargyl-N-methyl-X | B.P. 136°/0.1 mm. |

Others may practice the invention in any of the numerous ways which will be apparent to one skilled in the art by the present disclosure. All such practice of the invention is considered a part hereof provided it falls within the scope of the appended claims.

I claim:

1. A compound of the formula

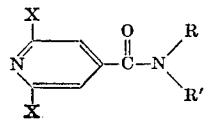

wherein each X is chlorine or bromine, R is a saturated or unsaturated linear alkyl, cycloalkyl, chloroalkyl or cyanoalkyl and R' is alkyl, cyanoethyl, hydroxyethyl, chloroethyl or cyclopropyl, the terms alkyl and cycloalkyl both identifying chains of at most 4 carbon atoms.

2. The compound of claim 1 wherein each X is chlorine, R is methyl and R' is methyl.

3. The compound of claim 1 wherein each X is chlorine, R is ethyl and R' is cyanomethyl.

4. The compound of claim 1 wherein each X is chlorine and R and R' both are 2-cyanoethyl.

5. The compound of claim 1 wherein each X is chlorine, R is methyl and R' is cyclopropyl.

6. The compound of claim 1 wherein each X is chlorine, R is ethyl and R' is cyclopropyl.

7. The compound of claim 1 wherein each X is chlorine, R is propargyl and R' is cyclopropyl.

8. The compound of claim 1 wherein each X is chlorine, R is cyclopropylmethyl and R' is cyclopropyl.

9. The compound of claim 1 wherein each X is bromine, R is ethyl and R' is cyclopropyl.

References Cited

UNITED STATES PATENTS

| | | | |
|---|---|---|---|
| 3,192,229 | 6/1965 | Biel | 260—326.3 |
| 2,776,294 | 1/1957 | Rey-Bellet et al. | 260—295 |
| 2,647,904 | 8/1953 | Rey-Bellet | 260—295 |

HENRY R. JILES, *Primary Examiner.*

A. L. ROTMAN, *Assistant Examiner.*